Dec. 13, 1949 W. H. GILLE 2,491,372
CONTROL SYSTEM
Filed April 10, 1944 2 Sheets-Sheet 2
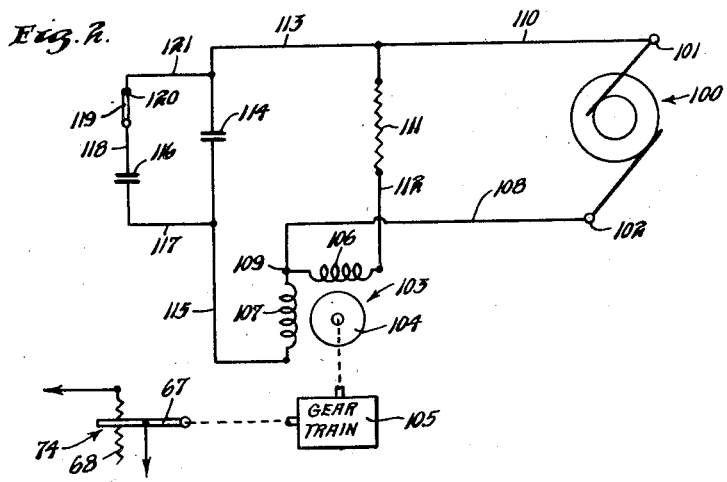
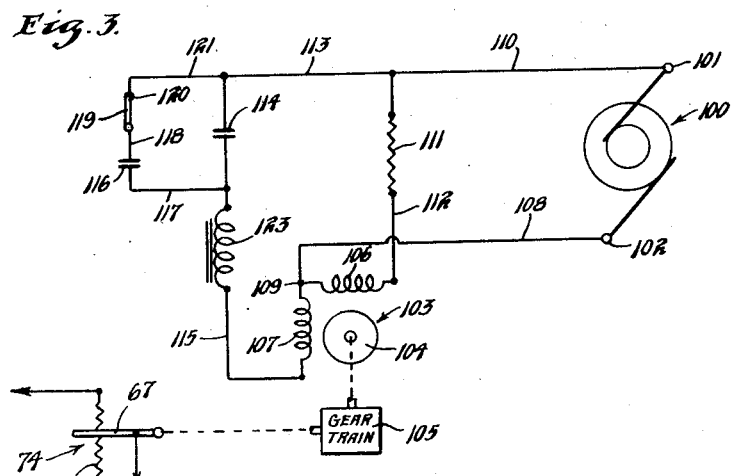
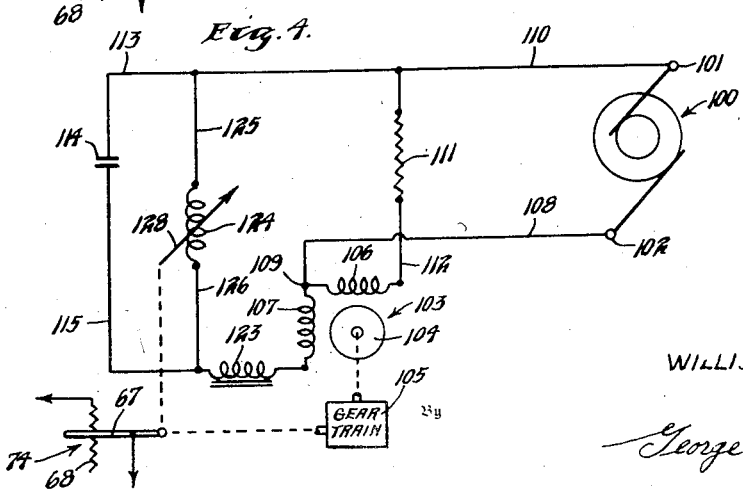
Inventor
WILLIS H. GILLE
By George H. Fisher
Attorney Patented Dec. 13, 1949

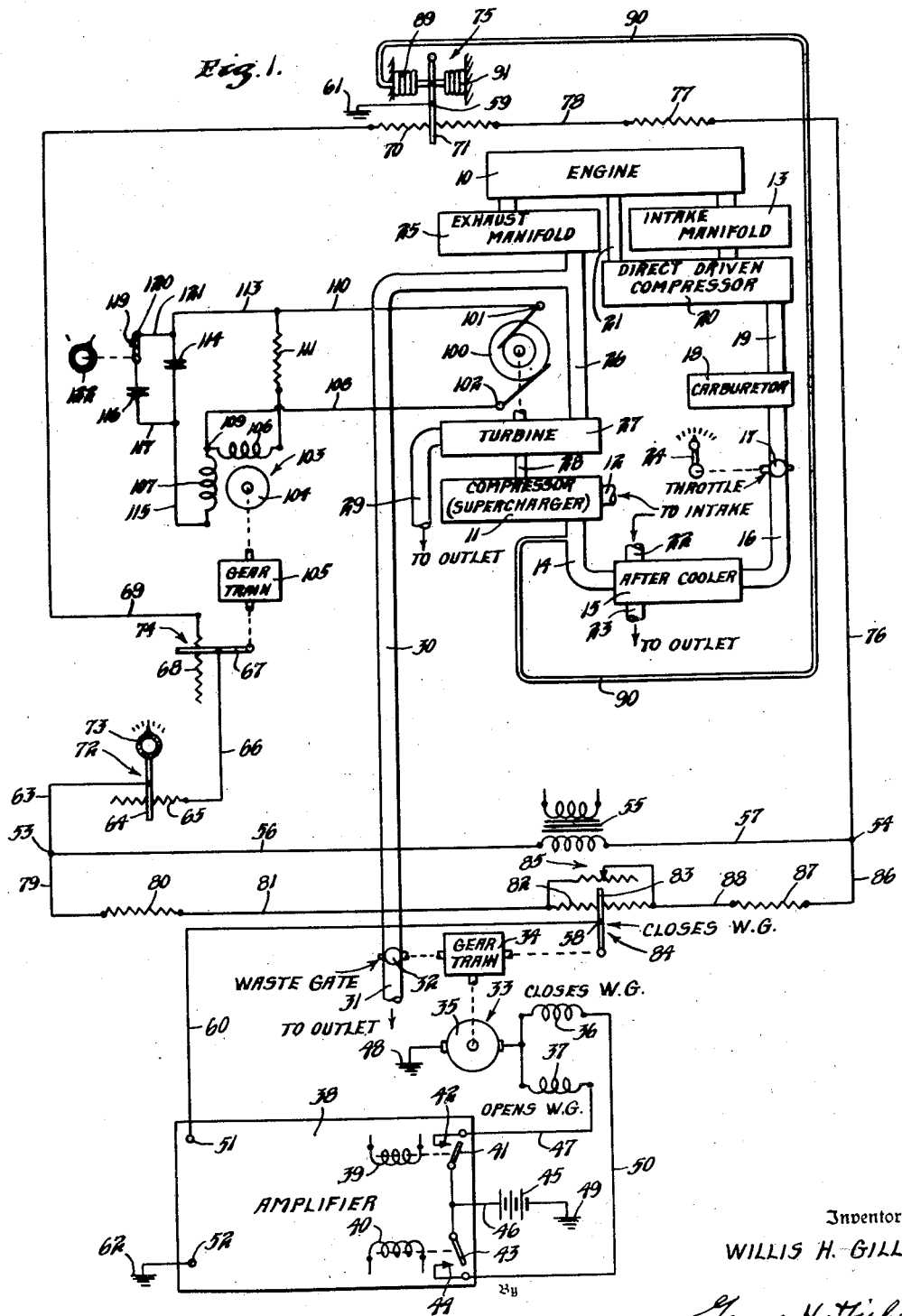

2,491,372

UNITED STATES PATENT OFFICE 2,491,372

CONTROL SYSTEM

Willis H. Gille, St. Paul, Minn., assignor to Minneapolis-Honeywell Regulator Company, Minneapolis, Minn., a corporation of Delaware Application April 10, 1944, Serial No. 530,424

11 Claims. (Cl. 230—5)

1

This invention relates generally to control systems of an electrical nature, and more particularly to a system, or means, for controlling or indicating the speed of a moving element.

The invention has particular application to electronic control systems for the supercharger or air compressor of an aircraft engine or similar internal combustion engine. Such systems usually include a turbine for driving the compressor, and this turbine is powered by the exhaust gases from the engine under control of a valve, commonly called a waste gate, which, when opened, by-passes the gases to atmosphere to reduce the operating speed of the turbine, and when closed, diverts more of the gases through the turbine to increase its speed. The compression ratio of the compressor increases and decreases with its speed and the position of the waste gate thus determines the pressure of the air supplied by the compressor to the engine for combustion purposes. Electronic means is provided to position the waste gate according to requirements and for maintaining a selected value of the pressures of the air supplied to the engine.

It is necessary also to provide means in such systems for limiting the speed of the turbine and compressor, since otherwise an increase in the need for supercharging, due to the ascent of the aircraft to high altitudes, or other reasons, may cause the turbine and compressor to exceed a maximum safe operating speed, with resulting damage to these parts. On the other hand, there are times when it is necessary or desirable to increase the speed of these parts above this safe level in order to facilitate maneuvering of the aircraft and such overspeed periods, if not too long in duration, are entirely practicable. It follows, then, that not only is an overspeed control of an automatically functioning nature desirable in such systems but also that manually operable means should be provided for overriding this control at any time at the direction of the pilot or engineer of the aircraft, in order to afford short periods of extra power, commonly called "war power," when required in emergencies.

Heretofore systems of this nature have usually employed a mechanically functioning governor device connected to the turbine-compressor unit and operating a variable element in the circuit controlling the waste gate to override the call of the circuit for closing movements of the waste gate to increase the pressure of the air supplied to the engine, when such an increase would cause an over-speeding condition. Such systems have necessarily been fairly complicated, however, and

2 have also been difficult to arrange for manual selection of emergency speed of the turbine when required.

It is the primary object of my invention, therefore, to improve this phase or part of such control circuits by the provision of an electrical system for limiting the speed of the turbine-compressor unit and with convenient means for overcoming such limit control when excess power is required and thereby permitting the turbine and compressor to operate at higher speeds for limited periods.

Another object is to provide a resonant network or circuit between the variable frequency generator and a reversible motor means which will operate in such a manner as to cause the motor means to operate only when the speed of the generator is above or below a predetermined value.

Another object is to provide such an arrangement in which the motor is a two phase motor and in which the circuit to one winding includes a capacitive reactance so that the phase relation between the currents flowing through the two windings is changed with a change in frequency.

Another object is to provide in a system of this nature a means for varying the resonant point of the network to thereby control the point at which reversal of the motor means will be obtained.

These and other objects of the invention will be made apparent in the course of the following detailed specification, reference being had therein to the accompanying drawings, in which:

Figure 1 is a schematic illustration of my control system as applied to an electronically controlled turbine-compressor system for an aircraft engine.

Figure 2 is a schematic showing of the circuit comprising only the over-speed control portion of my invention.

Figure 3 is a similar view but showing a modification of my control system.

Figure 4 is a schematic showing of still another modification.

Figure 1

Referring now more particularly to the drawings, I have shown in Figure 1 thereof in schematic form a complete induction and exhaust system for an engine 10, which may be the engine of an aircraft. Air for supporting combustion in the engine is supplied by a compressor 11, commonly called a supercharger, which takes the air from the atmosphere at an intake 12 and delivers the air to the intake manifold 13 of the engine through a duct 14, an after cooler 15, a duct 16, a throttle 17, a carburetor 18, a duct 19, and another compressor 20 directly driven by the engine by a shaft 21. The after cooler 15 is used to reduce the heat of compression to which the air is subjected in the compressor 11, receiving fresh air from an intake 22, passing it in heat exchanging relation to the air delivered by the compressor, and discharging the cooling air through an outlet 23. The throttle 17 may be hand manipulated as indicated by the controller 24.

The exhaust gases from the engine pass from an exhaust manifold 25 through a duct 26 to a turbine 27 which drives the compressor 11 as indicated at 28, the gases escaping from the turbine to the atmosphere through an outlet 29. A by-pass duct 30 leads off from the duct 26 to another outlet 31 and a valve 32, commonly called a waste gate, is provided in the duct 30. As this waste gate is opened the exhaust gases, meeting less resistance through the duct 30 than through the turbine 27, pass through the outlet 29 with the result that the speed of the turbine is reduced. On the other hand, as the waste gate 32 is progressively closed, more and more of the total volume of exhaust gases is diverted through the turbine and the speed thereof increases. The speed of the compressor 11, and hence its compression ratio and the pressure of the air delivered thereby may thus be controlled by positioning the waste gate 32.

For positioning the waste gate 32 a motor 33 is provided, the same being connected through a gear train 34 to the waste gate and being here shown as of the direct current, series wound type having an armature 35 and a pair of field windings 36 and 37. As indicated by the legends the motor may be arranged so that as the field winding 36 is energized the waste gate 32 will be run toward closed position, and as winding 37 is energized the waste gate is moved toward open position.

This selective energization of the windings of the motor 33 is controlled by an amplifier 38 which may be of any suitable type such as that shown in Figure 2 of the co-pending application of Albert P. Upton, Serial No. 437,561, filed April 3, 1942, which isssued July 8, 1947 as Patent No. 2,423,534.

The amplifier 38 as here shown includes a pair of relays 39 and 40. The relay 39 controls the position of a switch arm 41 with respect to a fixed contact 42, closing this switch when the winding of the relay is energized. The relay 40 controls a switch arm 43 closing it against a fixed contact 44 when the relay winding is energized.

When the relay 39 is energized a circuit may be traced from the left terminal of a battery 45 through a conductor 46 leading to both switch arms 41—43, switch arm 41, the fixed contact 42, a conductor 47, field winding 37, through the armature 35, through ground connections 48 and 49, and back to the other terminal of the battery. When the relay 40 is energized, a circuit may be traced from the left terminal of the battery 45, through conductor 46, switch arm 43, fixed contact 44, a conductor 50, field winding 36, armature 35 and through the ground connections 48—49 back to battery. Thus the energization of the relay 39 causes the motor 33 to rotate in one direction, as here indicated to open the waste gate 32, while energization of the relay 40 causes opposite movements of both motor and waste gate.

The amplifier 38 has signal input terminals 51 and 52 and operates to energize selectively the relays 39—40 according to the phase of an alternating electrical potential applied to these terminals.

The phase of the electrical signal potential applied to the amplifier input terminals 51—52 is determined by an electrical network of the Wheatstone bridge type which will now be briefly described. The bridge has a pair of input terminals 53—54 to which is connected the secondary winding of a transformer 55 by means of conductors 56—57. The bridge also has a pair of output terminals 58—59, the first of which is connected through a conductor 60 to the amplifier input terminal 51, and the second one 59 of which is connected through grounds at 61—62 to the other input terminal 52.

The upper left branch of the bridge connects the input terminal 53 to output terminal 59 and may be traced through a conductor 63, a slider 64, a slidewire resistance 65 with which slider 64 cooperates, a conductor 66, a slider 67, a slidewire resistance 68 with which slider 67 cooperates, a conductor 69, a portion of a slidewire resistance 70 and to a slider 61 which cooperates with resistance 70, and on which slider the terminal 59 is shown located. The slider 64 and resistance 65 together form a control point adjuster 72 which is operable by a knob 73. The slider 67 and resistance 68 together form an overspeed limiting controller 74 which operates as will later be described. The resistance 70 and slider 71 together form a control potentiometer 75 as will also be later set out.

The upper right branch of the bridge connects the input terminal 54 to the output terminal 59, and may be traced through a conductor 76, a fixed resistance 77 and a conductor 78 to the resistance 70 and through a portion thereof to the slider 71.

The lower left branch of the bridge connects the input terminal 53 to output terminal 58 and may be traced through a conductor 79, a fixed resistance 80, a conductor 81 and a portion of a slidewire resistance 82 with which cooperates a slider 83 whereon the output terminal 58 is shown as located. The resistance 82 and slider 83 together form a rebalancing potentiometer 84 and the slider is adjusted simultaneously with the waste gate 32 through a connection as shown to the gear train 34. A variable resistance 85 is connected across the resistance 82 to control the effective resistance range thereof in a well known manner.

The lower right branch of the bridge connects the input terminal 54 to output terminal 58 and may be traced through a conductor 86, a fixed resistance 87, a conductor 88 and a portion of slidewire resistance 82 to the slider 83.

The slider 71 of the control potentiometer 75 is adjusted along the resistance 70 in accordance with the absolute pressure of the air at some point between the compressor 11 and intake manifold 13. For this purpose a pair of evacuated bellows are provided, one bellows 89 having its interior connected through a conduit 90 to such point, here shown as being adjacent the outlet of the compressor 11 in what is known as the induction system. The other bellows 91 is provided to compensate the control for changes in ambient air pressures in a well known manner, and both bellows are connected as shown to the slider. As the bellows 89 is expanded by an increase in air pressure in the induction system the slider 71 moves to the right, as here shown, while as the bellows collapses due to a decrease in such pressure the slider moves in the opposite direction.

Operation of Figure 1

With the parts in the positions shown the bridge is assumed to be in a balanced condition. That is, the output terminals 58 and 59 are at equal potential with respect to the input terminals 53 and 54. No signal potential is then present at the amplifier input terminals 51 and 52.

Now should the pressure at the discharge side of the compressor 11 fall, such as might be caused by the ascent of the aircraft to a higher altitude, the bellows 89 will collapse moving the slider 71 to the left along the resistance 70. The potential at the output terminal 59 then changes, becoming more nearly that of the input terminal 53 and a difference in potential is present at the amplifier. The resulting signal is assumed then to be of a phase such as to cause the amplifier to energize the relay 40 causing the motor 33 to run in the proper direction to move the waste gate 32 toward closed position. The speed of the turbine 27 and compressor 11 is thus increased and the added compression builds the pressure back up toward the desired value.

At the same time the slider 83 is adjusted along with the waste gate 32 and moves toward the left toward a point of balance again with respect to the terminal 59. The slider 71 is, however, now moving toward the right again due to the increasing pressure and a point will be reached at which the bridge is again balanced and the motor 33 stops leaving the waste gate in a nearer closed position.

The operation in response to an increase in pressure above the selected value will be obvious, it being understood that the phase of the signal introduced by the unbalancing of the bridge is then opposite to that previously described, causing the amplifier to energize relay 39 and run the motor in opposite direction to open the waste gate.

The control point adjuster 72 may be manipulated to increase or decrease the resistance in the upper left branch of the bridge. The setting of the slider 64 thus determines the intake manifold pressure to be maintained. An increase in the value of the resistance 65 effective in the circuit has the same unbalancing effect on the bridge as an increase in air pressure and thereby calls for an opening of the waste gate, and vice versa.

The foregoing system as thus far described is in all essential respects identical with that shown in Figure 1 of the co-pending application of Hubert T. Sparrow, Serial No. 476,797, filed February 22, 1943, which issued August 2, 1949 as Patent No. 2,477,668.

The overspeed control

The controller 74, as stated, is a speed limiting control and in the usual case, for example as disclosed in the Sparrow application above identified, is operated by a governor mechanism connected to the turbine 27. This governor mechanism (not here shown) positions the slider 67 to increase the value of the resistance 68 inserted into the bridge when the speed of the turbine builds up beyond a safe value, called the overspeed, and thus calls for an opening movement of the waste gate to counteract this speed increase. In effect the controller 74 over-rides the call of the main controller 75 for a closing movement of the waste gate when such movement would cause the speed to exceed the safe value.

In accordance with my invention, this controller 74 is adjusted by electrical means as will now be described. The circuit is more clearly shown, apart from the bridge, in Figure 2 and attention is invited thereto.

Figure 2

A variable frequency generator or alternator is indicated at 100 having output terminals 101 and 102. This generator has an output alternating current potential of a frequency determined by its speed of rotation.

A reversible, alternating current split phase motor is indicated at 103 and has an armature 104 which is connected through a gear train 105 to the slider 67 of controller 74, or to any other suitable work. The motor 103 also has a pair of field windings 106—107 and when one winding is energized with a current which leads the phase of the current in the other, the armature will be rotated in one direction, whereas when this current in this first winding lags the current in the other, the motor operates in the opposite direction.

A conductor 108 connects the generator terminal 102 to the common junction 109 of the field windings 106—107 and a conductor 110 connects the other generator terminal 101 to one end of a resistance 111 from which a conductor 112 leads to the other terminal of the field winding 106. This field winding 106 is thus continuously energized by the generator 100 with a current, the frequency of which varies in proportion to the speed of operation of the generator. As a result of the phase shifting effect of the winding 106 due to the inductive reactance thereof the current in this winding lags in phase with respect to the phase of the voltage at the output of the generator, this lag in phase being reduced by the resistance 111.

A conductor 113 is connected (through conductor 110) to the generator output terminal 101 and to one terminal of a condenser 114. A conductor 115 connects the other terminal of the condenser 114 to the other terminal of the motor field winding 107. The generator 100 thus supplies a variable frequency current to this field winding 107 through the condenser 114. A second condenser 116 is connected by one terminal through a conductor 117 to one terminal of the condenser 114. The other terminal of this condenser 116 is connected by a conductor 118 to a switch arm 119 normally in engagement with a fixed contact 120 connected to the other terminal of the condenser 114 by a conductor 121. With this switch 119—120 closed, as is normally the case, the condensers 114—116 are obviously connected in parallel.

Operation of Figure 2

The condensers 114 and 116 and motor field winding 107 (assuming the switch 119—120 to be closed) together form a series resonating circuit. At a certain frequency of the current supplied by the generator this circuit will resonate, with the result that the phase of the current at the field winding 106 is equal to or matches the phase of the output voltage of the generator. As the speed increases, the effect of the condensers 114 and 116 will decrease and that of winding 107 will increase. This increase in the relative effect of condensers 114 and 116 as compared with that of winding 107 will be greater than the increase in the effect of resistance 111 with respect to that of winding 106. As a result, a point will be reached in which the current through the windings 106 and 107 are in phase with each other. This point may be regarded as a point at which the condensers 114 and 116 are in resonance with a portion of the inductive reactance of winding 107. This may also be considered as a condition of resonance between condensers 114 and 116 and a portion of the winding 107, the resonant portion of the circuit being in series with the remaining portion of the winding. At this speed, there will be no tendency of the rotor 104 to rotate and the motor will be at rest.

Now should the frequency of the output current of the generator increase, due to an increase in speed thereof, the series circuit including the condensers 114 and 116 and field winding 107 will become more inductively reactive than the series circuit including winding 106, due to the decreasing effect of condensers 114 and 116 as compared with resistance 111, whereupon the phase angle of the current at the winding 107 will lag that in the winding 106. The motor 103 will then rotate in one direction so long as this condition exists. On the other hand, should the frequency of the generator output current decrease, due to a corresponding change in the speed of the generator, the series circuit including the condensers 114 and 116 and field winding 107 will become less inductively reactive so that the phase of the current is advanced at such lower frequencies. The phase of the current in the winding 107 will then lead that of the current in winding 106 and the motor will rotate in the opposite direction as long as this condition exists.

Thus as the frequency of the current supplied to the generator increases the series resonant network connecting the generator and the motor field winding 107 becomes increasingly inductively reactive while as the frequency decreases the circuit becomes less inductively reactive, varying the phase shift through the circuit in the manner described. At a predetermined frequency substantially above resonant frequency, which predetermined frequency in practice will correspond to the frequency, and hence speed of the generator, which is to be maintained, the inductive reactance of each winding circuit will be equal. It will be evident, therefore, that a change in speed of the generator 100 above or below the selected speed will be reflected by a reversal of the motor rotation.

The magnitude of condensers 114 and 116 effectively controls the resonant frequency of the circuit and hence the predetermined frequency at which motor reversal takes place. By opening the switch 119—120 to remove the condenser 116 from in parallel with the condenser 114, the effective capacity will be decreased. The resonant frequency of a series resonant circuit being calculated by the formula:

$$\text{Frequency} = \frac{1}{2\pi\sqrt{LC}}$$

where L equals the inductance (of the field winding 107) and C the capacity, it follows then that such decrease in the capacity of the condenser increases the frequency at which the series circuit will resonate and hence will increase the frequency at which the circuits through both windings are inductively reactive to the same extent.

In its application to Figure 1, the generator 100 is, as shown therein, connected to the turbine 27 for operation thereby, while the gear train 105 is connected to the slider 67. Assuming the circuit constants to be properly chosen, the operation of the turbine at or near safe maximum speeds will result in a generator output frequency at which the series circuit including the condensers 114 and 116 and a portion of field coil 107 will resonate, and the motor 103 will stand idle with the slider 67 near or at the end of the resistance 68 as seen in Figure 1. Now if the speed of the turbine starts to exceed this safe value, the resulting frequency change will operate the motor 103 to adjust the slider to add a part of the resistance 68 to the upper left branch of the bridge and cause the amplifier 38 to open the waste gate until the speed has been reduced to the desired value. The controller 74 thus effectively over-rides the control point adjuster 75 in its call for a pressure increase which would necessitate the turbine exceeding its safe operating speed. As the speed of the turbine and generator decreases the motor 103 reverses to return the slider 67 toward starting position. Any conventional means can be provided for protecting the motor and associated apparatus when it reaches its starting position. For example, fixed stops can be provided and the rotor can be mounted so as to slide on its shaft when the slider 67 reaches the end stops. It is obviously desirable that some such arrangement be provided at the upper end of movement of the rheostat arm. While normally the correction introduced by downward movement of the slider 67 will prevent the slider ever reaching its end position, it may be desirable in certain cases also to provide such a stop arrangement to limit the downward movement of slider arm 67.

However, should the pilot or engineer desire added manifold pressure and resulting emergency power from the engine for a short period, he may readily obtain the same by opening the switch 119—120 to disconnect condenser 116 from the circuit. As stated hereinbefore, this decreased capacity increases the speed at which motor reversal takes place and permits the waste gate to be closed beyond the normal point. For convenience the switch arm 119 may be manipulated by a knob 122 (Figure 1) located convenient to the hand of the pilot or engineer of the aircraft.

*Figure 3*

In the arrangement of Figure 2, the speed at which the current through the two motor windings is in phase is one in which a resonant condition existed only between the condensers 114 and 116 and a portion of the winding 107. In order for the currents through the two windings 106 and 107 to be in phase with each other under these conditions, it is necessary that the current through winding 107 be greater than that through winding 106. In other words, if the condensers 114 and 116 and a portion of winding 107 are resonant with each other, it is necessary that the voltage drop across the remaining part of winding 107 be equal to that across the winding 106. This can only occur when a greater amount of current is flowing through winding 107 than through winding 106. In the arrangement of Figure 3, an additional inductive reactor 123 has been connected in series with condensers 114 and 116, this reactor having such an inductance with respect to the capacitance of condensers 114 and 116 that the two are at resonance at the desired maximum speed. With this arrangement, when the desired speed is reached, the condensers 114 and 116 and the reactor 123 function together solely as a resistor to exert an effect comparable to that of resistor 111. Under these circumstances, the current flowing through the two windings is in phase at the resonant frequency.

As with the arrangement of Figure 2, the condenser 116 may be disconnected from condenser 114 by opening switch 119 to change the resonant frequency when it is desired to operate the turbine at a higher speed than normally considered desirable.

*Operation of Figure 3*

The operation of the system of Figure 3 will be obvious from the previous description of Figure 2 and the above description of the elements of Figure 3. As long as the frequency is below the desired maximum, the slider 167 will be maintained at one end of resistor 68. Upon the speed rising above the speed corresponding to the resonant frequency, the motor 103 will be rotated in such a direction as to move arm 67 downwardly with respect to resistor 68 so as to introduce a variable portion of resistor 68 into the circuit. This will in turn cause the waste gate to move towards open position to reduce the speed to the desired value. As soon as the speed reaches the desired value, the current through the two windings will be in phase again so that the motor 103 will stop. When the speed again drops below the maximum desired value, the motor will be operative to return the slider 67 to the upper end of resistor 68.

The system is shown again as arranged for operating the controller 74 but is not, of course, limited to such application.

*Figure 4*

In Figure 4, a similar system is shown and so far as the circuit is common to that of Figure 3, similar reference characters are used to indicate corresponding parts.

In this system, the condenser 114 is paralleled by a variable inductive reactor 124 connected by conductors 125 and 126 to the opposite terminals of the condenser 114. The reactor 124 is then arranged to be varied in magnitude as the motor 103 rotates by a connection 128 to the gear train 105 as shown. As with Figure 3, an inductive reactor 123 is connected in series with winding 107.

*Operation of Figure 4*

The system of Figure 4 will operate like that of Figures 1 and 3 except that as the motor 103 is set in operation by a change in frequency of the alternator output from the selected value, the reactor 124 is varied at the same time. Should the frequency increase, due to an increase in the speed of generator 100, the resulting increase in inductive reactance of the series circuit including the condenser 114, the inductive reactor 123 and the winding 107 will cause motor rotation in a direction such as to cause downward movement of slider 67. The connection 128 is so designed that this movement causes an accompanying decrease in the value of variable reactor 124 to counteract such increased reactance of the series circuit. The movement of slider 67 will continue until the decreased effect of the variable reactor 124 will offset the inductive reactance of the circuit brought about by the increase in frequency of the alternator output. The opposite effect will be present when the frequency decreases.

The reactor 124 is thus seen to act as a follow-up impedance. Since the movement of slider 67 is, with this arrangement, proportional to the change in frequency, it will be readily apparent that a system of this nature may be employed as a frequency meter, the slider 67 or other driving parts being calibrated to read the magnitude of frequency directly, as will be understood.

I claim as my invention:

1. In combination; a compressor; means for driving said compressor; control means including a device responsive to a pressure condition affected by the operation of the compressor for controlling the operation of a first reversible motor which adjusts said driving means to maintain said pressure condition at a constant value; and speed limiting means for varying the action of said control means to prevent the speed of said driving means from exceeding a predetermined critical value regardless of the value of said pressure condition, said speed limiting means comprising a variable frequency generator driven by said driving means and having a periodically varying current output of a frequency dependent upon the speed of the motor, a second reversible motor associated with said control means, said second reversible motor comprising two phase windings connected to said generator, said motor operating in one direction or another depending upon whether the current in one winding leads or lags that through the other, and means responsive to the frequency of the generator output for varying the phase relationship between the currents flowing through said windings of said second reversible motor to cause the latter to affect said control means to reduce the speed of said driving means whenever it exceeds said predetermined critical value, said previously named means including capacitively and inductively reactive impedances connected in series with one of said motor windings and which are resonant at a predetermined frequency related to said critical speed.

2. In combination; a compressor; a motor for driving said compressor; control means for said motor, said control means comprising an electrical network including an impedance varied by a device responsive to a pressure condition affected by the operation of the compressor so as to control the operation of a first reversible electric motor which adjusts the speed of said driving motor to maintain said pressure condition at a constant value; and speed limiting means for varying the action of said control means to prevent the speed of said driving motor from exceeding a predetermined critical value regardless of the value of said pressure condition, said speed limiting means comprising a variable frequency generator driven by said driving motor and having a periodically varying current output of a frequency dependent upon the speed of the driving motor, a further variable impedance in said network, a second reversible motor for varying the value of said further impedance, and means responsive to the frequency of the generator output for controlling said second reversible motor to cause the latter to affect said control means to reduce the speed of said driving motor whenever it exceeds said predetermined critical value.

3. In combination; a compressor; means for driving said compressor; control means including a device responsive to a pressure condition affected by the operation of the compressor for controlling the operation of a first reversible motor which adjusts the speed of said driving means to maintain said pressure condition at a constant value; and speed limiting means for varying the action of said control means to prevent the speed of said driving means from exceeding a predetermined critical value regardless of the value of said pressure condition, said speed limiting means comprising a variable frequency generator driven by said driving means and having a periodically varying current output of a frequency dependent upon the speed of the driving means, a second reversible motor associated with said control means, said second reversible motor having two phase windings connected to the output of said generator and said second motor operating in reverse directions with a reversal in the phase relationship in the current flowing through the windings, and means responsive to the frequency of the generator output for varying the phase relationship between the currents flowing through said windings of said second reversible motor to cause the latter to affect said control means to reduce the speed of said driving means whenever it exceeds said predetermined critical value.

4. In combination; a compressor; means for driving sad compressor; control means including a device responsive to a pressure condition affected by the operation of the compressor for controlling the operation of a first reversible motor which adjusts the speed of said driving means to maintain said pressure condition at a constant value; and speed limiting means for varying the action of said control means to prevent the speed of said driving means from exceeding a predetermined critical value regardless of the value of said pressure condition, said speed limiting means comprising a variable frequency generator driven by said driving means and having a periodically varying current output of a frequency dependent upon the speed of the driving means, a second reversible motor associated with said control means, said second reversible motor having two phase windings connected to the output of said generator and said second motor operating in reverse directions with a reversal in the phase relationship in the current flowing through the windings, and means responsive to the frequency of the generator output for varying the phase relationship between the currents flowing through said windings of said reversible motor to cause the latter to affect said control means to reduce the speed of said driving means whenever it exceeds said predetermined critical value, said last named means comprising impedance elements which are resonant at a predetermined frequency related to said critical speed.

5. In combination; a compressor; means for driving said compressor; control means including a device responsive to a pressure condition affected by the operation of the compressor for controlling the operation of a first reversible motor which adjusts said driving means to maintain said pressure condition at a constant value; and speed limiting means for varying the action of said control means to prevent the speed of said driving means from exceeding a predetermined critical value regardless of the value of said pressure condition, said speed limiting means comprising a variable frequency generator driven by said driving means and having a periodically varying current output of a frequency dependent upon the speed of the driving means, a second reversible motor associated with said control means, said second reversible motor having two phase windings connected to the output of said generator and said second motor operating in reverse directions with a reversal in the phase relationship in the current flowing through the windings, means responsive to the frequency of the generator output for varying the phase relationship between the currents flowing through said windings of said second reversible motor to cause the latter to affect said control means to reduce the speed of said driving means whenever it exceeds said predetermined critical value, said last named means comprising capacitively and inductively reactive impedance means which are resonant at a predetermined frequency related to said critical speed, and means for changing the value of one of said impedance means to vary the value of said critical speed.

6. In combination; a compressor; means for driving said compressor; control means including a device responsive to a pressure condition affected by the operation of the compressor for controlling the operation of a first reversible motor which adjusts the speed of said driving means to maintain said pressure condition at a constant value; and speed limiting means for varying the action of said control means to prevent the speed of said driving means from exceeding a predetermined critical value regardless of the value of said pressure condition, said speed limiting means comprising a variable frequency generator driven by said driving means and having a periodically varying current output of a frequency dependent upon the speed of the driving means, a second reversible motor associated with said control means, said second reversible motor having two phase windings connected to the output of said generator and said second motor operating in reverse directions with a reversal in the phase relationship in the current flowing through the windings, means responsive to the frequency of the generator output for varying the phase relationship between the currents flowing through said windings of said second reversible motor to cause the latter to affect said control means to reduce the speed of said driving means whenever it exceeds said predetermined critical value, said last named means comprising capacitively and inductively reactive impedance means which are resonant at a predetermined frequency related to said critical speed, and means driven by said second motor to vary the reactance of one of said impedance means to terminate operation of the second motor when the same has moved an amount proportional to that by which the speed has exceeded said predetermined critical value.

7. In a speed control for a turbine driven compressor, first electrical motor means variably positioned to regulate the speed of the compressor, means including an electrical network connected to energize said first motor means, second electrical motor means, means indicative of the need for a change in the speed of the compressor controlling said second motor means, and means connecting said second motor means to said network in a manner to variably adjust the energizing effect of said network upon said first motor means.

8. In a speed control for a turbine driven compressor, first electrical motor means variably positioned to maintain a predetermined speed of the compressor, amplifier means, a balanceable electrical network having a rheostat therein, energizing means for said first motor means including said amplifier and said network, said energizing means being adapted to be effective in accordance with the balance of said network, second electrical motor means, means indicative of the need for a change in speed of the compressor controlling said second motor means, and means connecting said second motor means to the rheostat of said network to vary the balance of said network in accordance with the maintaining of a predetermined desired speed of said compressor.

9. In a speed control for a turbine driven compressor, a first electrical reversible motor means adapted to regulate the speed of the compressor, a second electrical motor means, energizing means for said second motor means including means indicative of the need for a change in speed of the compressor, and electrical coupling means interconnecting said first and second motor means in such a manner that said second motor means is effective to position said first motor means to maintain a predetermined speed of said compressor, said electrical coupling means including an electrical amplifier.

10. In a speed control for a turbine driven compressor, a first electrical motor means adapted to vary the speed of the compressor, a second electrical motor means, energizing means for said second named motor means including compressor speed responsive means controlling said second named motor means upon the compressor exceeding a predetermined speed, and electrical coupling means interconnecting said first and second motor means, said coupling means including electrical amplifier means for energizing said first motor means in accordance with the energization of said second motor means by said speed responsive means to maintain the speed of the compressor below a predetermined safe value.

11. In a speed control for a turbine driven compressor, an electrical motor for regulating the speed of the compressor, means including a balanceable electrical network connected to cause a reverse control effect of said motor with reversal in balance of said network, electrical phase responsive means, means indicative of the need for a change in the speed of the compressor reversibly controlling said phase responsive means in accordance with the phase of an electrical signal controlled by the speed of the compressor, and means connecting said phase responsive means to said network to variably adjust the balance of said network in accordance with the phase of the signal applied to said phase responsive means.

WILLIS H. GILLE.

REFERENCES CITED

The following references are of record in the file of this patent:

UNITED STATES PATENTS

| Number | Name | Date |
| --- | --- | --- |
| 511,560 | Tesla | Dec. 26, 1893 |
| 649,006 | Steinmetz | May 8, 1900 |
| 1,310,683 | Sherbondy | July 22, 1919 |
| 1,346,563 | Sherbondy | July 13, 1920 |
| 1,557,793 | Berger et al. | Oct. 20, 1925 |
| 2,151,127 | Logan | Mar. 21, 1939 |
| 2,260,122 | Moore | Oct. 21, 1941 |
| 2,290,884 | Kollmann | July 28, 1942 |
| 2,376,142 | Hoffman et al. | May 15, 1945 |